(12) United States Patent
Washio

(10) Patent No.: US 6,957,324 B2
(45) Date of Patent: Oct. 18, 2005

(54) COMPUTER SYSTEM AND METHOD OF CONTROLLING COMPUTATION

(75) Inventor: Takumi Washio, Tokyo (JP)

(73) Assignee: NEC Corporation, Tokyo (JP)

( * ) Notice: Subject to any disclaimer, the term of this patent is extended or adjusted under 35 U.S.C. 154(b) by 580 days.

(21) Appl. No.: 09/964,749

(22) Filed: Sep. 28, 2001

(65) Prior Publication Data

US 2002/0040428 A1 Apr. 4, 2002

(30) Foreign Application Priority Data

Sep. 29, 2000 (JP) ........................................ 2000-299683

(51) Int. Cl.[7] .............................................. G06F 12/00
(52) U.S. Cl. ........................................ 712/225; 712/6
(58) Field of Search ............................... 712/6, 9, 225; 711/129, 153

(56) References Cited

U.S. PATENT DOCUMENTS

| 5,517,666 | A | * | 5/1996 | Ohtani et al. .................. 712/3 |
| 5,680,641 | A | * | 10/1997 | Sidman ........................ 710/20 |
| 5,742,842 | A | * | 4/1998 | Suetake et al. ................. 712/3 |
| 5,745,721 | A | * | 4/1998 | Beard et al. ................. 712/208 |
| 6,003,129 | A | * | 12/1999 | Song et al. .................. 712/244 |
| 6,029,242 | A | * | 2/2000 | Sidman ........................ 712/42 |
| 6,065,092 | A | * | 5/2000 | Roy ............................... 711/5 |
| 6,314,501 | B1 | * | 11/2001 | Gulick et al. ................ 711/153 |
| 6,571,328 | B2 | * | 5/2003 | Liao et al. ...................... 712/35 |

* cited by examiner

Primary Examiner—Eric Coleman
(74) Attorney, Agent, or Firm—McGinn IP Law Group, PLLC

(57) ABSTRACT

A vector computer system includes a plurality of memory banks 40, a vector processor 11, and a plurality of additional processing units 30 each of which is connected to one of the memory banks 40. Each of the additional processing units 30 reads data from the corresponding memory bank 40 by referring to an address designated by the processor 11, and performs a designated operation about the data. Then the additional processing unit 30 stores the result of the operation into the designated address.

19 Claims, 13 Drawing Sheets

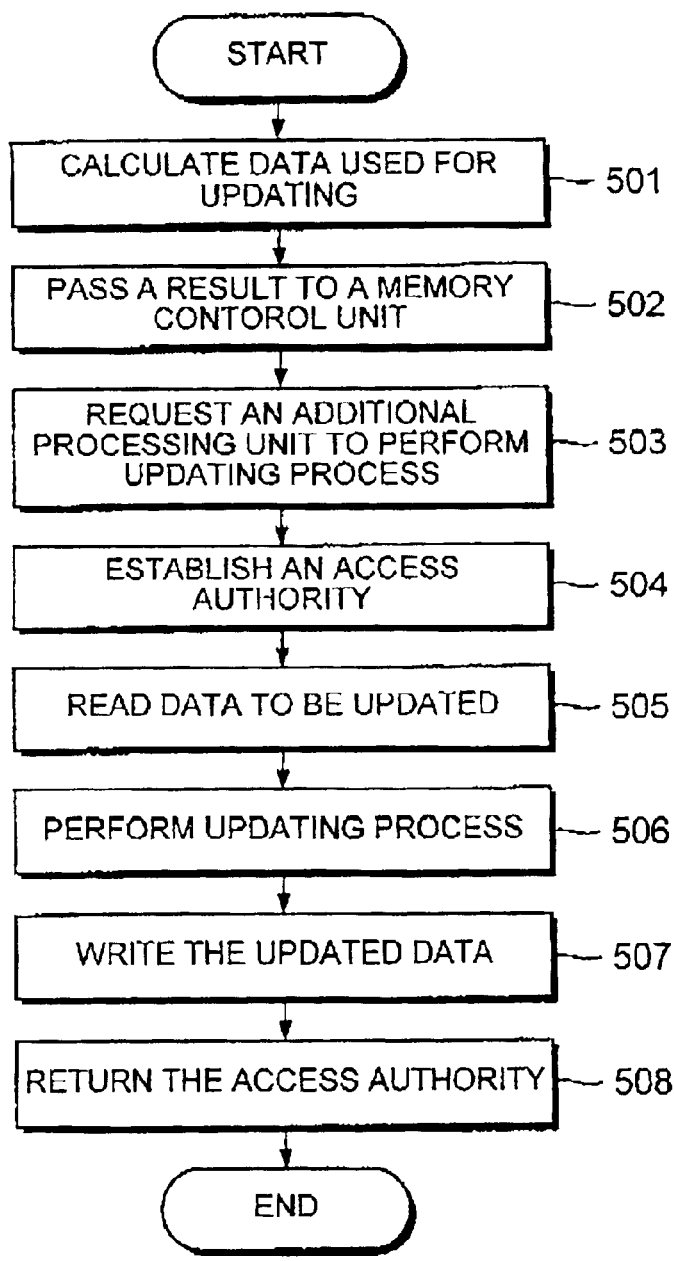

| k | a(k) | column(k) | x(column(k)) | a(k)*x(column(k)) |
|---|------|-----------|--------------|-------------------|
| 1 | 6    | 1         | 2            | 12                |
| 2 | 5    | 2         | 0            | 0                 |
| 3 | 4    | 1         | 2            | 8                 |
| 4 | 3    | 5         | 1            | 3                 |

FIG. 9

| k | a(k)*x(column(k)) | row(k) | y(row(k)) | y(row(k))+a(k)*x(column(k)) |
|---|-------------------|--------|-----------|------------------------------|
| 1 | 12                | 1      | 7         | 19                           |
| 2 | 0                 | 1      | 19        | 19                           |
| 3 | 8                 | 3      | 9         | 17                           |
| 4 | 3                 | 5      | 11        | 14                           |

FIG. 10

COMPUTER SYSTEM AND METHOD OF CONTROLLING COMPUTATION

BACKGROUND OF THE INVENTION

1. Field of the Invention

The invention relates to a computer system which includes a plurality of memory banks and, in particular, to a computer system which is capable of performing a high-speed computation, such as a parallel computer or a computer having a vector processor.

2. Description of the Related Art

To achieve high-speed processing in a computer, a technology including a vector operation or a parallel operation has been used.

In a large-scale computer such as a super computer, plenty of time is used to repeat similar operation which consists of predetermined procedures on each data, for example, a matrix calculation or operations in Do-loop statements in Fortran language.

In the vector processor, to achieve the repetition in a high-speed, matrices and data are gathered into one or more vectors and computation of the vectors are performed in a single instruction. Thereby, it is not required to perform calculation for each element in the matrix. As a result, the vector processor can perform the calculation in a high-speed. The high-speed calculation of the matrix is done by dividing instructions about the elements into a plurality of phases such as "calling of instruction", "interpretation of instruction", and "address computation", and performing each phase in parallel under a pipeline control.

In the parallel operation, each of a plurality of processors (computers) is used to perform processing of data corresponding to the processor in parallel and consequently, whole process are performed in a high-speed.

Also the data which are thus gathered in the vector processor and assigned to the corresponding processor, may often individually processed in its processing. Such the individual process occurs, for example, by a conditional operation. The conditional operation may be set by an "IF" statement in a Do-loop in Fortran language.

For example, there may be a case in a loop where after elements in an array are loaded via indirect referencing, predetermined computation is executed on the elements, and the computation results are stored into each original address where the element is originally stored. In particular, the above aspect of operation often occurs in a scientific computation of finite-element method and molecular dynamics.

In a loop including such the operation, it is required to guarantee that a plurality of data under vectorization or parallelization are not stored into the same location. If the operation in the loop is performed via forced vectorization or parallelization without the guarantee, an incorrect computation result may be obtained.

Also, in a process of classifying data in a group into predetermined new groups one by one, it is difficult to perform the classifying process via vectorization or parallelization. That is, in a loop of the classifying process, each of counters corresponds to a new group and when it is determined that data belongs to one of the new group, the counter of the new group is updated. If the classifying process is performed via forced vectorization or parallelization, consistency of updating counters may be not maintained.

In a conventional technique, if such the operation in a loop is performed via vectorization or parallelization, a programmer must avoid duplication of location where updated data are stored or duplication of updating of a counter, by improving method of storing data or changing an order of computations.

Therefore, there are problems to be solved in a conventional computer system.

First, it is a burden for a programmer to make a special program to avoid duplication of a location where updated data are stored or duplication of updating a counter, in a conventional computer system.

Second, it is difficult to amend programs which have been accumulated to adapt to a vector computer or a shared memory parallel computer, since it is required to drastically amend the programs to adapt to them.

Further, some applications can not be performed in a high-speed, since a preparation process for parallel processing or vector processing of the applications can not be performed via vectorization or parallelization.

SUMMARY OF THE INVENTION

Therefore, it is an object of the invention to provide a computer system and a computation control method which can overcome the above problems.

Further, it is an object of the invention to provide a computer system and a computation control method which can realize easy vectorization or parallelization for various processes which have been considered to be difficult to perform via vectorization or parallelization.

According to a first aspect of the invention, there is provided a computer system which includes a plurality of memory banks. The computer system comprises a processor unit which controls processing of an operation and additional processing units each of which corresponds to one of the memory banks and performs the operation independent of the processor unit. And wherein, the operation is performed about data stored in the corresponding memory bank based on an instruction or data provided from the processor unit.

According to a second aspect of the invention, there is provided a computer system of the first aspect, wherein the operation that each of the additional processing units performs includes at least one of calculating the data, reading the data from the memory bank, or writing the data to the memory bank.

According to a third aspect of the invention, there is provided a computer system of the first aspect, wherein the address of the data in the memory bank is provided by the processor unit, and each of the additional processing units reads the data by referring to the address and performs the operation designated by the processor about the read data, and writes the result of the process into the address.

According to a fourth aspect of the invention, there is provided a computer system of the third aspect, wherein when the additional processing unit receives information from the processor unit and the operation designated by the processor is one of the four basic operations of arithmetic, the additional processing unit performs one of the four basic operations using the read data and the received information.

According to a fifth aspect of the invention, there is provided a computer system of the third aspect further comprising an addition updating unit which updates the data located in the address designated by the processor unit to a value resulting from adding of the data and a predetermined value, and a subtraction updating unit which updates the date located in the address designated by the processor unit to a value resulting from subtracting a predetermined value from the data.

According to a sixth aspect of the invention, there is provided a computer system of the first aspect, wherein the processor unit performs a vector operation.

According to a seventh aspect of the invention, there is provided a computer system of the first aspect, wherein the processor unit consists of a plurality of processors each of which performs an operation in parallel with another processor.

According to an eighth aspect of the invention, there is provided a method of controlling computation in a computer system which includes a plurality of memory banks. The method comprises the steps of (1) instructing, at a processor unit, additional processing units each of which is connected to one of the memory banks and works independent of the processor unit, to perform an operation, (2) reading, at the additional processing unit, data located in an address designated by the processor unit from the corresponding memory bank, (3) performing, at the additional processing unit, the operation instructed by the processor unit about the read data, and (4) writing, at the additional processing unit, the result of the operation into the address designated by the processor unit.

According to a ninth aspect of the invention, there is provided a recording medium readable by a computer, tangibly embodying a program of instructions executable by the computer to perform a method of controlling computation in a computer system which includes a plurality of memory banks. The method comprises the steps of (1) instructing, at a processor unit, additional processing units each of which is connected to one of the memory banks and works independent of the processor unit, to perform an operation, (2) reading, at the additional processing unit, data located in an address designated by the processor unit from the corresponding memory bank, (3) performing, at the additional processing unit, the operation instructed by the processor unit about the read data, and (4) writing, at the additional processing unit, the result of the operation into the address designated by the processor unit.

According to a tenth aspect of the invention, there is provided a computer data signal embodied in a carrier wave and representing a sequence of instructions which, when executed by a processor, cause the processor to perform a method of controlling computation in a computer system which includes a plurality of memory banks. The method comprises the steps of (1) instructing, at a processor unit, additional processing units each of which is connected to one of the memory banks and works independent of the processor unit, to perform an operation, (2) reading, at the additional processing unit, data located in an address designated by the processor unit from the corresponding memory bank, (3) performing, at the additional processing unit, the operation instructed by the processor unit about the read data, and (4) writing, at the additional processing unit, the result of the operation into the address designated by the processor unit.

BRIEF DESCRIPTION OF THE DRAWINGS

FIG. 4 shows a diagram for describing a process of a computer system of the invention;

FIG. 5 shows a flowchart for describing a process of a computer system of the invention;

FIG. 9 shows a diagram representing an example of the matrix operation "y=y+Ax" shown in FIG. 7, using the algorithm shown in FIG. 8;

FIG. 10 shows FIG. 9 shows a diagram representing another example of the matrix operation "y=y+Ax" shown in FIG. 7, using the algorithm shown in FIG. 8;

DESCRIPTION OF THE PREFERRED EMBODIMENT

A computer system according to the invention includes a plurality of additional processing units each of which corresponds to one of memory banks and cooperates with the corresponding memory bank. The plurality of additional processing units work individually. The additional processing unit performs a local exclusive operation for the corresponding memory bank and data in the memory bank are properly updated.

Thereby, the computer system can realize, without preparing a special program, easy vectorization or parallelization for various processes which have been considered to be difficult to perform via vectorization or parallelization.

Also, the computer system according to the invention can be applied to a vector computer or a (memory shared) parallel computer.

Figure 1:
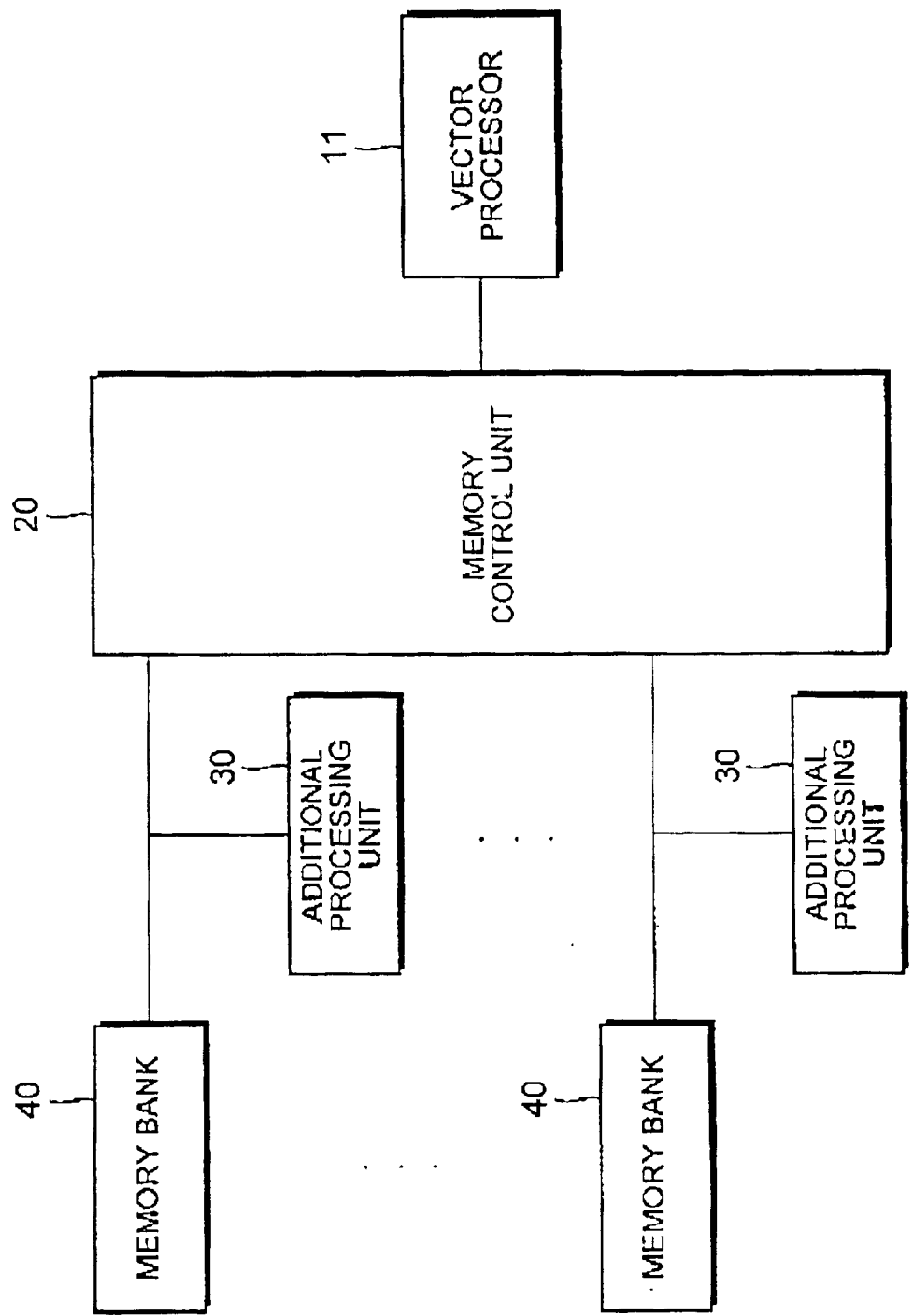
FIG. 1 shows a diagram of a computer system, according to a first embodiment of the invention, which is applied to a vector computer system.
Figure 2:
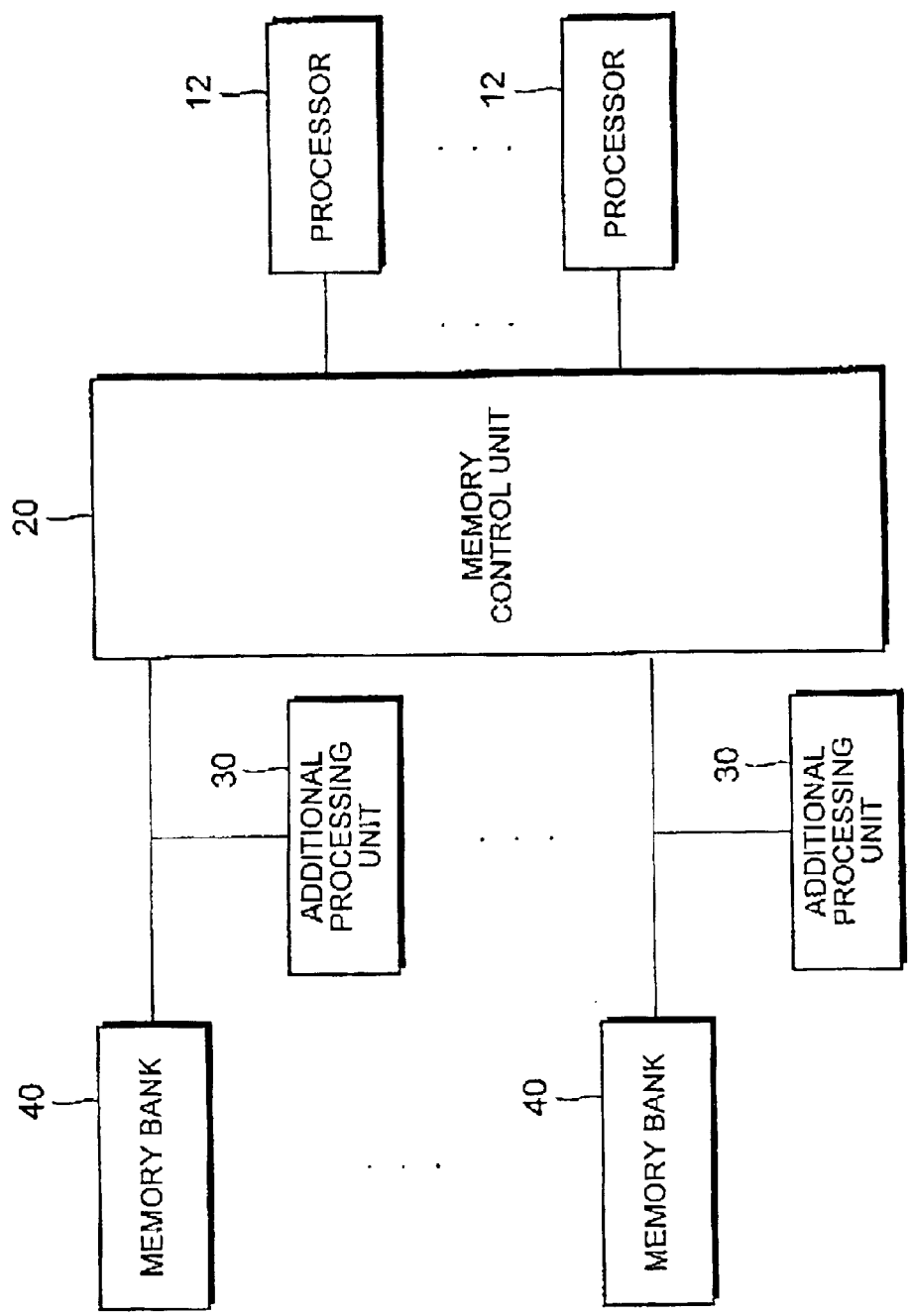
FIG. 2 shows a diagram of a computer system, according to a second embodiment of the invention, which is applied to a parallel computer system.

In both computer systems shown in FIGS. 1 and 2, an additional processing unit 30 is connected to each memory bank 40.

Further, the computer system shown in FIG. 1 includes a vector processor 11 which performs a vector operation. On the other hand, the computer system shown in FIG. 2 includes a plurality of processors 12 each of which performs an operation in parallel with each other. Hereinafter, a unit including such the processor(s) is referred to as a "processor unit".

Also, in both the systems, a memory control unit 20 is located between the processor unit and memory banks 40. The memory control unit 20 accesses the memory banks 40 and controls transmission of instructions or data to the additional processing units 30.

Each of the additional processing units 30 establishes or frees an access authority (exclusive control) to data stored in the corresponding memory bank 40. Further, the additional processing unit 30, for example, reads and writes the data, or performs an operation for the data. Also, in performing the operation for the data, the additional processing unit 30 has a function to perform predetermined operations such as the four basic operations of arithmetic (addition, subtraction, multiplication, and division) using the data from the memory bank 40 and data from the processor unit.

And then, data update operation of the memory bank 40 is completed by writing a result obtained from the operation into an original address of the data stored in the memory bank 40. Also, the additional processing unit 30 does not have only the function to update existing data, but also have a function to write a new data into the memory bank 40.

Figure 3:
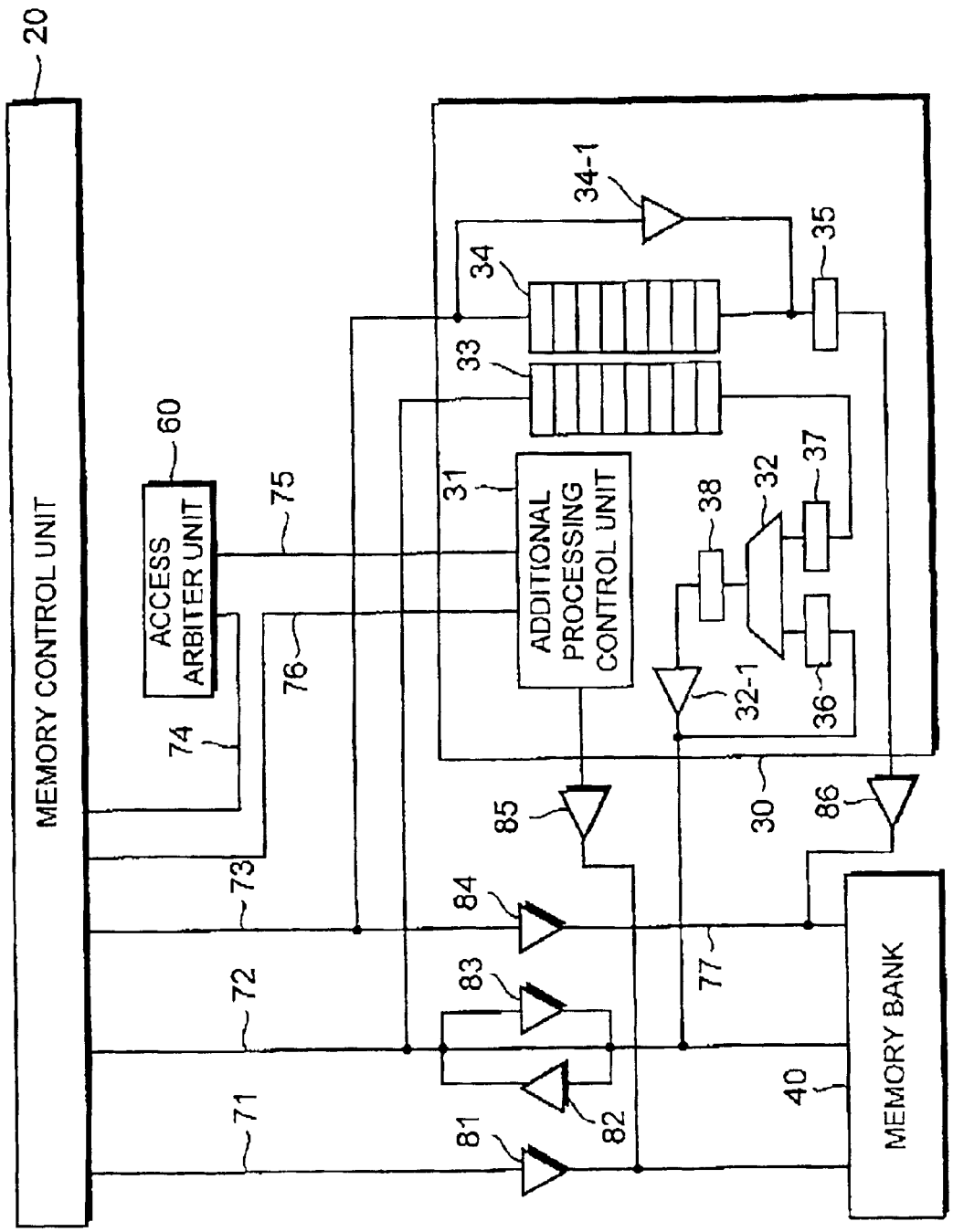
FIG. 3 shows a block diagram representing a connection between an additional processing unit 30 according to the invention and a memory bank 40, and a configuration of the additional processing unit 30.

Referring to FIG. 3, connection is made between the memory control unit 20 and the memory bank 40 via a memory control line 71, a data line 72, and an address line 73. On the memory control line 71, instructions to control the memory bank 40 are transmitted, and on the data line 72, data to be stored or already stored data are communicated. The address line 73 transmits an address of data directed to a destination address of the memory bank 40.

In addition, an access arbiter unit 60 is located between the memory control unit 20 and the additional processing unit 30, and the arbiter unit 60 arbitrates exclusive control of the memory access. Also, the access arbiter unit 60 is connected to the memory control unit 20 via an access arbiter line 74, and connected to the additional processing control unit 31 via an access arbiter line 75. Further, an additional processing control line 76 is located between the memory control unit 20 and the additional processing unit 30 to inform the additional processing unit 30 from the memory control unit 20, of contents of operations to be executed or contents of update process.

Next, description is made about processing of the computer systems shown in FIGS. 1 and 2.

As shown in FIG. 4, in this example, a value f(a, b, c, . . . ) which is determined by a predetermined calculation is added to data "Y" stored in the memory bank 40, and a result value of the addition is stored to the original address in the memory bank 40. Also, a sign "+=" is an operator meaning that the value in the right part is added to the variable in the left part.

In this case, the processor unit (the vector processor 11 shown in FIG. 1 or the processor 12 shown in FIG. 2) performs an operation to determine "f(a, b, c, . . . )", which is denoted as the right part of an equation shown in FIG. 4. Then, the processor unit sends a result of the operation to the additional processing unit 30. And next, the additional processing unit 30 loads data "Y" to be updated, and performs a designated operation (in the case in FIG. 4, an addition operation) between the loaded data "Y" and the result value from the processor unit. Consequently, the loaded data "Y" are updated, then the data "Y" are written into the memory bank 40.

Also, the additional processing unit 30 is a processing unit that performs an operation, and read operation or write operation of data, independent of the processor unit. Therefore, the additional processing unit 30 stores, in order, instructions or data received from the processor unit into a data shift register 33 or an address shift register 34, and executes the stored instructions (or data) in the stored order. Therefore, in the processor unit, when it is required to update data in the memory bank 40, for example, during a loop of a vector operation, the processor unit can properly execute a required operation without suspension of the operation by instructing the additional processing unit 30 to update the data in the memory bank 40.

Therefore, even if data update process is required in a loop, a high-speed operation process can be easily performed. But, in a conventional computer system, it is required to make a special program, as described above.

Next, description is made about a process of a computer system according to the invention.

FIG. 5 shows a flowchart representing a process of the computer system, and it applies to both the embodiments of the computer system shown in FIGS. 1 and 2.

First, the vector processor 11 of FIG. 1 and the processor 12 of FIG. 2 calculate data used for updating (step 501). The data are, in the example of FIG. 4, "f(a, b, c, . . . )", which are the right part of the equation shown in FIG. 4.

Each of the processors (11, 12) passes the result of the calculation, an address of data to be updated, and identification of calculation performed in the updating, to the memory control unit 20 (step 502). In the example of FIG. 4, the address of the data to be updated is an address of "Y", and the calculation is adding data. Thus, the processors inform the memory control unit 20 of an operation process such as one of the four basic operation, for example, adding as an operation to be performed by the additional processing unit 30.

When the memory control unit 20 receives the information from the processors, the unit 20 requires the additional processing unit 30 to perform the updating process of the data (step 503). The additional processing unit 30 which is required to perform the updating process, is an additional processing unit which corresponds to a memory bank 40 where the data to be updated are to be stored.

Herein, the memory control unit 20 requests the additional processing unit 30 to perform the updating process, by sending the data used for the updating via the data line 72, sending the data to be updated via the address line 73, and sending the identification of calculation via the additional processing control line 76.

The additional processing control unit 31 detects signals from the memory control unit 20 and stores the data used for the updating into the data shift register 33. Further, the unit 31 stores the address of the data to be updated into the address shift register 34. After that, the unit 31 informs the memory control unit 20 of completion of the store operations via the additional processing control line 76.

Then, the additional processing unit 30 performs an operation by reading the data stored in the data shift register 33 and the address stored in the address shift register 34, in an order that the data are stored in each register.

When the unit 30 performs the operation on data received from the memory control unit 20, the unit performs an operation of memory access about the data. When the data appears in an exit of the data shift register 33, the additional processing control unit 31 receives the data from the exit of the data shift register 33 and stores them into a register 37, and receives an address from an exit of the address shift register 34 and stores it into a register 35. Then, the unit 31 request the access arbiter unit 60 to establish an access authority to access the memory bank 40 via the access arbiter line 75 (step 504).

The access arbiter unit 60 connects the memory bank 40 to the additional processing unit 20 and disconnecting the memory bank 40 from the memory control unit 20 when the request of the access authority. For example, in a configuration of the device shown in FIG. 3, switches 81, 82, 83, and 84 are turned off, and switches 85 and 86 are turned on. And the unit 60 gives to the additional processing control unit 31 an access authority of the memory bank 40, via the access arbiter line 75.

The additional processing control unit 31 reads the data to be updated into the register 36 when the unit 31 receives the access authority of the memory bank 40 (step 505).

Then, an additional operation unit 32 performs a designated operation by using the data which are to be updated and are stored in the register 36, and the data which are used for updating process and are stored in the register 37, and stores a result of the designated operation into a register 38 (step 506).

The additional processing control unit 31 then turns on a switch 32-1 and writes the updated data into the memory bank 40 (step 507).

When the additional processing control unit 31 completes the writing, the unit 31 informs the access arbiter unit 60 of return of the access authority of the memory bank 40, via the access arbiter line 75 (step 508). When the access arbiter unit 60 receives the return of the access authority, the unit 60 restores the switches changed in step 504 to the original state, specifically, connects back the memory bank 40 to the memory control unit 20 and disconnects the memory bank 40 from the additional processing unit 30.

As described above, a series of operations using the additional processing unit 30 are completed.

The shift registers 33 and 34 are located in the additional processing unit 30 because that the memory control unit 20 can quickly transits to the next process by storing requests of updating, even if the unit 20 receives many requests of updating about the same memory bank in a short interval.

Also, since the switches 81, 82, 83, and 84 are turned off on updating in the additional processing unit 30, the memory control unit 20 can not access the memory bank 40. But, the unit 20 can write to the additional processing unit 30, that is, write the data used for updating to the shift register 33 and write the data to be updated to the shift register 34.

Furthermore, in the example of FIG. 5, the data used for updating are transferred from the processor however, for example, in the case of processing a counter which is incremented by "1", it is enough to inform of contents of processing of the counter and an address of the data to be updated, and therefore, it is necessary to transfer a value of the data used for updating. The computer system of the invention can be applied to such the case.

Figure 6:
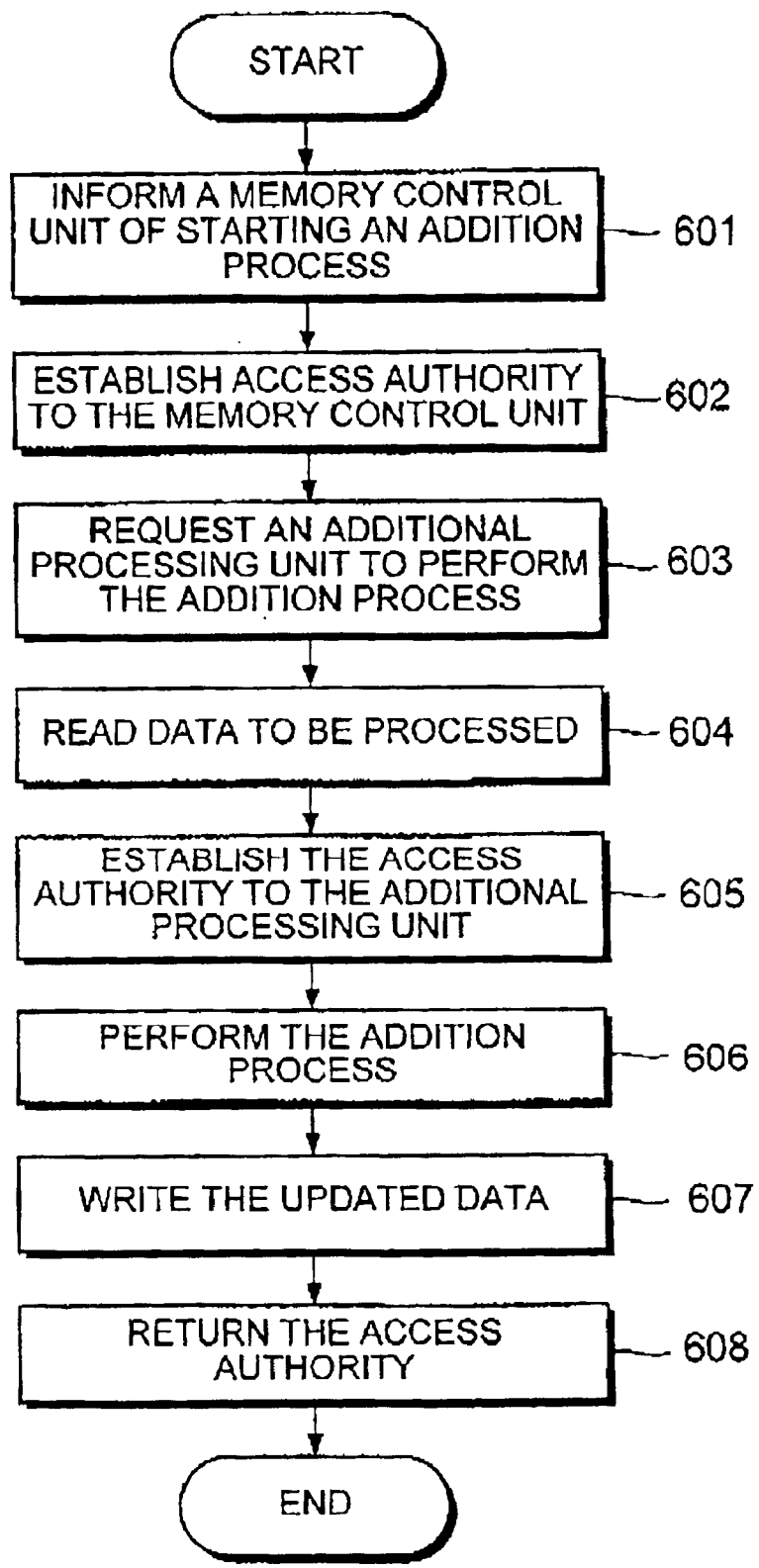
FIG. 6 shows a flowchart for describing an addition process of a counter.

Next, description is made about an addition process according to the invention with reference to FIG. 6. The process can be performed in both the embodiments of the computer system shown in FIGS. 1 and 2.

First, the vector processor 11 of FIG. 1 and the processor 12 of FIG. 2 inform the memory control unit 20 of an address of integral data to be updated by the addition process and starting the addition process of the integral data (step 601).

When the memory control unit 20 receives the information, the unit requests permission of the addition process to the access arbiter unit 60, via the access arbiter line 74 (step 602). If the access arbiter unit 60 have not give an access authority to the additional processing unit 30, the unit 60 gives the access authority to the memory control unit 20 and inform the unit 20 of the fact of giving via the access arbiter line 74. The access arbiter further controls the switches as required.

When the memory control unit 20 receives the access authority (is permitted), the unit 20 requests performing of the addition process to the additional processing control unit 31 via a additional processing control line 76 (step 603). In response to the request, the additional processing control unit 31 turns on the switches 34-1.

Next, the memory control unit 20 reads the data to be updated by the addition process (step 604). The unit can obtains the data by outputting an address of the data to be updated via an address line 73 and receiving the data via a data line 72. Also, the additional processing control unit 31 can store the data to be updated and the address of the data in the register 36 and the register 35, respectively, while the reading process is performed, by reading a data line 77 and an address line 73.

When the memory control unit 20 completes the addition operation, the access arbiter unit 60 automatically moves the access authority from the memory control unit 20 to the additional processing unit 30 (step 605). Specifically, the switches 31, 82, 83, and 84 are turned off.

The additional processing control unit 31 performs the addition operation by using the addition operation unit 32 (step 606). That is, the additional processing control unit 31 reads the data to be updated by the addition operation from the register 36 and performs the addition operation to store the updated data into the register 38.

The additional processing control unit 31 then writes the updated data at an address of the data to be updated (step 607). Specifically, the additional processing control unit 31 turns on the switches 86 and 32-1, and writes the updated date stored in the register 38 into an area located at an address, which is stored in the register 35, of the data which are to be updated and are in the memory bank 40.

When the additional processing control unit 31 completes the addition operation, the unit 31 informs the access arbiter unit 60 of return of the access authority (step 608). When the access arbiter unit 60 receives the information of return, the unit 60 restores the switches to the original state and connects the memory bank 40 to the memory control unit 20 with disconnecting to the additional processing unit 30.

As described above, a series of operations of the addition operation of the counter using the additional processing unit 30 are completed.

As shown in this example, a value of the counter can be correctly updated with a consistency by avoiding other memory access when data are updated.

Next, description is made about a concrete embodiment using the computer systems shown in FIGS. 1 and 2.

In a first embodiment, calculation is made about a sparse matrix. The sparse matrix is a matrix which the number of element having a value other than zero is low. Therefore, in calculation of the sparse matrix, most of the elements are not required to calculate, and various of high-speed calculation techniques are used.

Figures 7, 8:
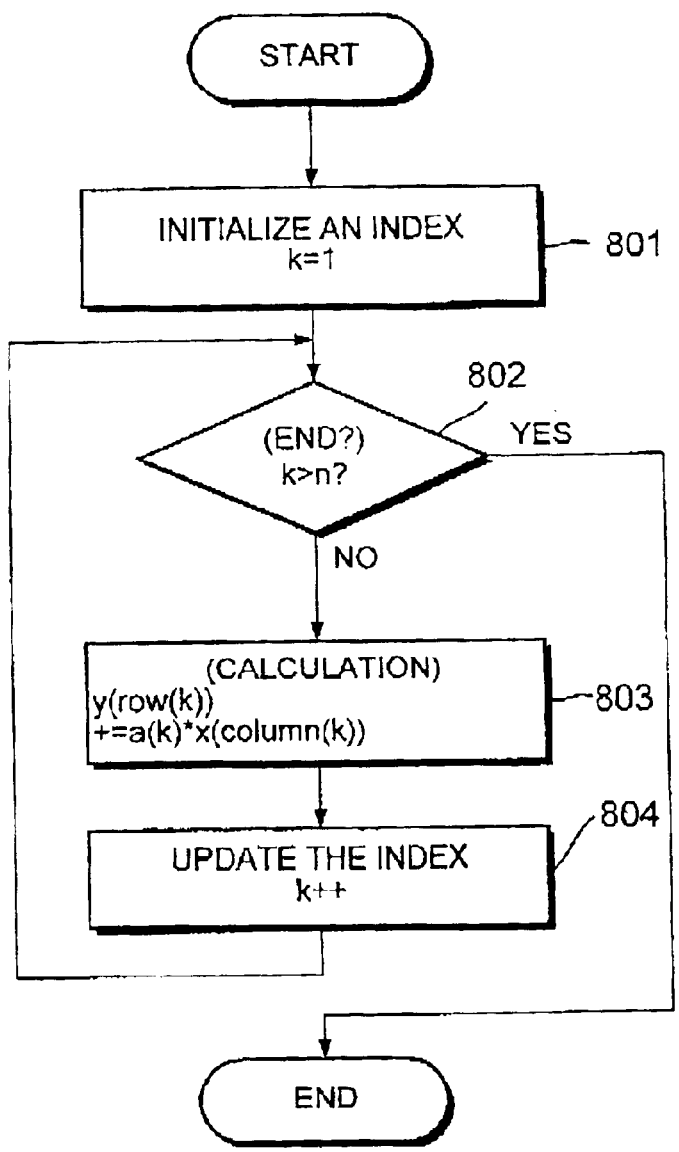
FIG. 7 shows a diagram representing an example of a matrix operation.
FIG. 8 shows a flowchart of an algorithm to perform a matrix operation "y=y+Ax"

In FIG. 7, a matrix resulting from multiplying a sparse matrix A and a matrix x, is added to a matrix y. That is, an equation "y=y+Ax" or "y+=Ax" is calculated.

FIG. 8 shows a flowchart of algorithm to process the equation. In FIG. 8, the number of elements other than zero (non-zero elements) in the sparse matrix A is denoted by "n" and each value of the non-zero elements is denoted by each element of an array "a". That is, n of values of elements in the array "a", "a(i)" (i=1 to n) correspond to values of the non-zero elements in the sparse matrix A.

Also, a row number, in the sparse matrix A, of each elements corresponding to the elements of array "a" is represented by an array "row". On the other hand, a column number of each elements corresponding to the elements of array "a" is represented by an array "column". That is, "a(i)" in the array "a" is located at a coordinates ("row(i)", "column(i)") in the sparse matrix. Also, an order of the non-zero elements in the array "a" is arbitrary.

In FIG. 8, non-zero elements in the sparse matrix are extracted in progress and then operation is performed for each extracted non-zero element. Thereby, the number of operations is reduced to realize a high-speed processing. The technique is conventional in the art of a computer system such as a vector computer system performing a high-speed calculation.

In FIGS. 9 and 10, an examples are shown about an algorithm to calculate the equation "y=y+Ax" shown in FIG. 7.

In the example of FIG. 7, there are four non-zero elements in the matrix A (that is, n=4). The elements are each located at one of coordinates (1, 1), (1, 2), (3, 1), and (5, 5), and stored in an array "a" in the order of the above coordinates. Therefore, the contents of the array "a" can be shown as follows.

a (1)="6"
a (2)="5"
a (3)="4"
a (4)="3".

Then, an operation can be done by using the array "a", column, row, x, and y. Referring to FIG. 9, the processor calculates data used for updating, that is, "a (k)*x(column (k))" (k=1 to 4). And then the processor detects addresses of data to be updated, that is, "y(row(k))" (k=1 to 4) and sends them and an instruction to update by adding to the memory control unit 20. Then the additional processing unit 30 receives the data and the instruction form the memory control unit 20 to perform updating process of array "y".

As a result, y(1), y(3), and y(5) are updated to 19, 17, and 14, respectively, consequently y=(19, 8, 17, 10, 14) is obtained.

It is noted that non-zero elements are located at the same row in the matrix A, that is, one element is located at the coordinate (1, 1) and the other is located at the coordinate (1, 2). It is required to perform the adding operation "y(row (k))+a(k)*x(column(k))" for the coordinates (1, 1) and (1, 2). Therefore, the operation simultaneously performed simultaneously on both the values in the coordinates leads to an incorrect result.

For example, before the array "y" is updated, a value of y(1) is equal to "7" and the value is updated when the index k is equal to one or two.

Referring to FIG. 10, a first updating process is done about k=1, to add "12" to y(1)(=7). Then a second updating process is done about k=2, to add "0". By the above updating procedure, y(1) is correctly updated to "19".

But, if the updating processes are simultaneously done about k=1 and k=2, "19" is obtained as a value of y(1) resulting from the updating process about k=1, and "7" is obtained as a value of y(1) resulting from the updating process about k=2. Therefore, as a result, an incorrect result may be produced.

The updating operation shown in FIG. 8 includes a problem that updating of the array is not performed correctly due to existence of more than two non-zero elements which are located in the same row in the sparse matrix A. That is, if a vector computer or a shared memory parallel computer performs an operation about the more than two elements which are located in the same row in a sparse matrix A, instructions to update the same element in the array "y" (step 803) may be issued in a unit of vectorization, or the instructions may be performed in the same time by the different processors and updating processes on the array "y" are simultaneously requested.

Therefore, in a conventional vector computer and a conventional shared memory parallel computer, it has been impossible to perform vectorization and parallelization for such the index k. However, it is capable of performing the vectorization and the parallelization by using the additional processing unit 30 shown in FIG. 3 as follows.

Figure 11:
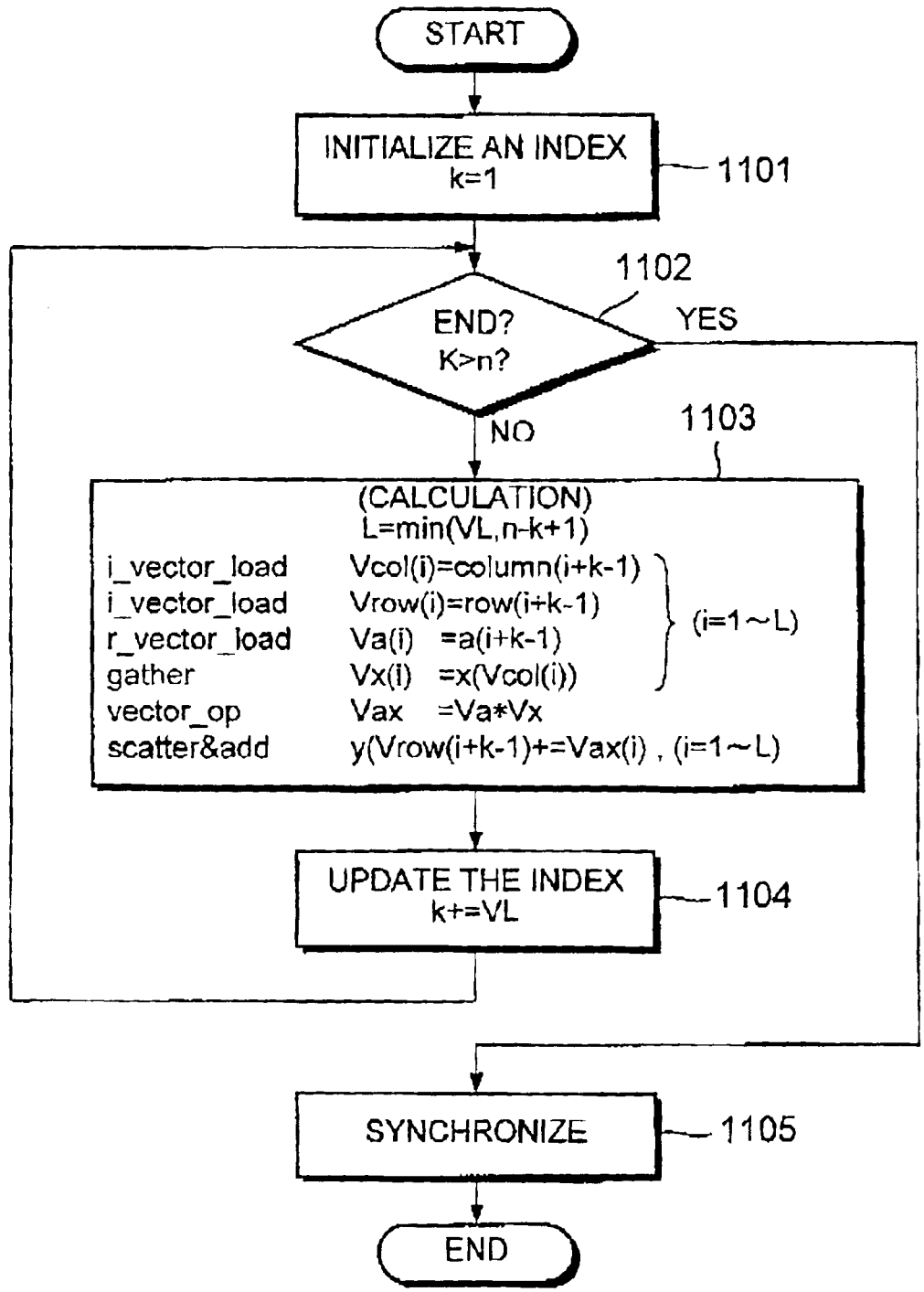
FIG. 11 shows a flowchart for describing a process for a matrix operation "y=y+Ax" in the vector computer system shown in FIG. 1.

In FIG. 11, (n of) non-zero elements in the sparse matrix A are denoted by array a(i) (i=1 to n) in an arbitrary order, in similar way to FIG. 8. Further, coordinates of a(i) which corresponds to a non-zero element are denoted by (row(i), column(i)) using an array row and an array column.

Also, in FIG. 11, index k (=1 to n) is used to perform vector processing. The index k is divided into a plurality of segments each of which has a vector register length VL. The vector register length VL shows the number of elements which are gathered on a single vectorization. The different values of vector register length may be established for each vector computer.

The last segment resulting from dividing the index may have a shorter length than the vector register length VL. If the last segment has the shorter length, undefined data (that is, data exceeds the index k=n) are read out. To overcome this problem, a length of the segment L is adjusted by using an equation "L=min(n−k+1, VL)".

Also, in step 1103, vector registers Vcol, Vrow, Va, and Vax are defined each of which is divided into a plurality of segments having a vector register length VL.

In FIG. 11, a vector computer system according to the invention performs a matrix operation "y=y+Ax" as follows.

First, an initial value "1" is set to the index k (step 1101). Calculation of step 1103 is continued until the value of the index k exceeds the number of non-zero elements "n" (step 1102).

In step 1103, values of the index k "1" to "n" are divided by a multiple of VL and a range of vectorization is determined. That is, division is made to generate groups of the index values such as (1 to VL), (VL+1 to 2*VL), and (2*VL to 3*VL), until an index value in a group exceeds "n".

Herein, using an instruction "i_vector_load", L of sequentially arranged data which begin with the index k of an integer array "column" are loaded to an address vector register Vcol. Also, a value of k takes a multiple of VL as shown in a updating process of step 1104. Similarly, data in an integer array "row" are loaded into an address vector register Vrow.

Further, using an instruction "r_vector_load", the real numbers of non-zero elements are loaded from the real number matrix "a" to a vector register Va.

Next, using an instruction "gather", location data which are shown in the address vector register Vcol of an integer matrix x, are loaded into a vector register Vx.

Then, on issuing an instruction "vector_op", the product of the data in the Va and the data in the Vx is determined by using a vector operation pipeline to store the product into a vector register Vax. The vector operation is performed for each element. That is, the equation "Vax=Va*Vx" can be rewritten to "Vax(i)=Va(i)*Vx(i) (i=1 to L)", and the equations are performed by using a vector operation pipeline.

Finally, using an instruction "scatter&add", the additional processing unit 30 adds the data in the Vax to data located at a location sequentially shown by the address vector register Vrow of an integer matrix y, and updates the data by storing y in an original location.

The instruction "scatter&add" is a command that instructs to perform addition and updating process about data distributed by a scatter process in the additional processing unit 30. That is, the vector processor distributes each data of the vector register Vax into a memory bank which data in the array "y" are to be stored, by using the scatter process, referring to the address vector register Vrow. And then the additional processing unit 30 performs the addition and updating process about data in the array "y", by using the distributed data.

When a gathered vector operation about VL of elements in step 1103 is completed, VL is added to the index k (step 1104), and the process proceeds to step 1102.

When the operation process about all of the non-zero elements of the matrix A is completed, the vector processor and the additional processing unit 30 synchronize with each other (step 1105) and complete the updating process after it is determined that there are no data to be added to the additional processing unit 30.

As described above, by using the vector computer according to the invention, vectorization of the index k is easily performed. For example, in the case of calculation of the equation shown in FIG. 7, the updating process of the value of y(1) when k=1 and k=2 is correctly performed since the additional processing unit 30 receives instructions of updating from the vector processor 11 one after another, and the instructions are stored in a shift register in the order of its reception.

Figure 12:
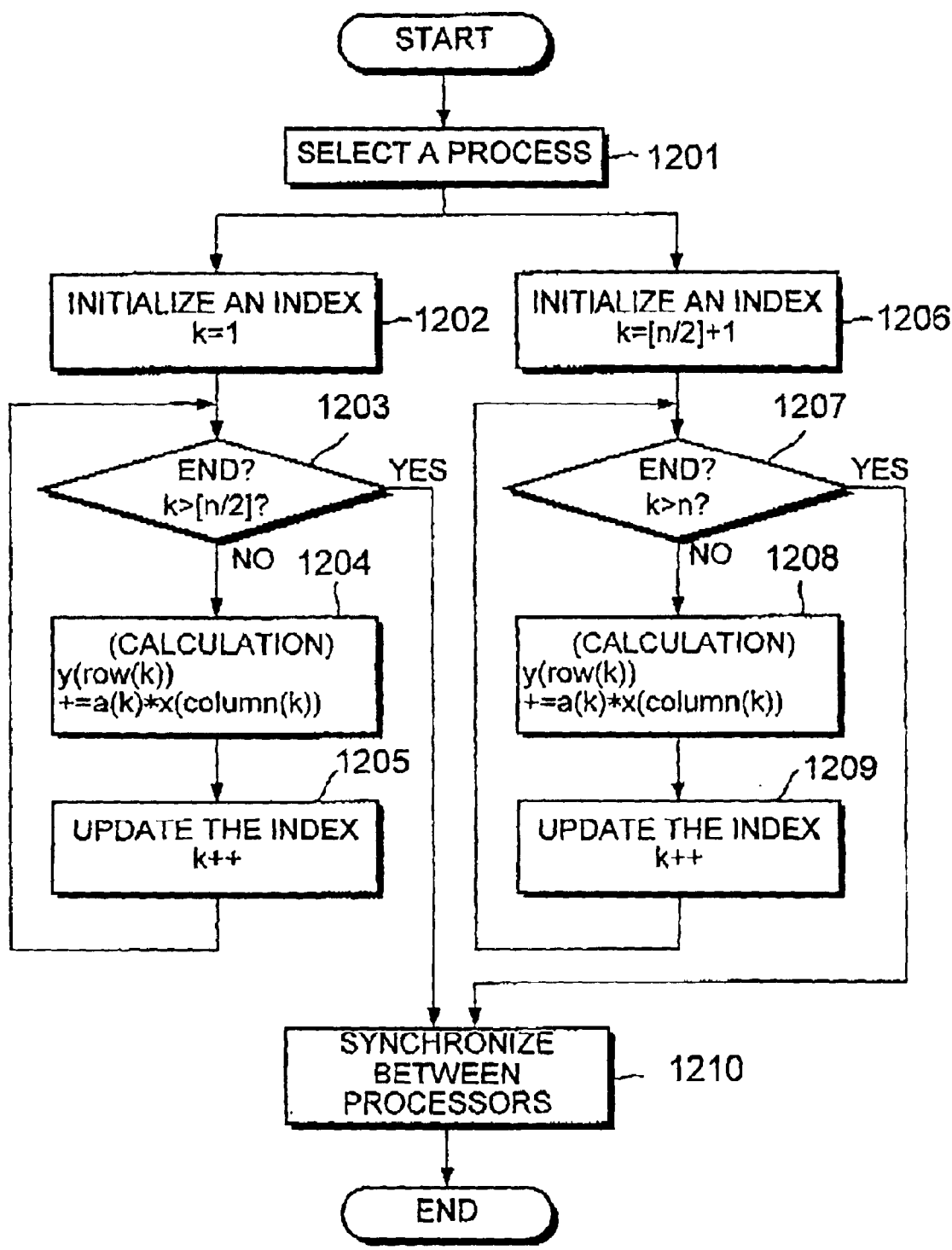
FIG. 12 shows a flowchart for describing a process for a matrix operation "y=y+Ax" in the shared memory parallel computer system shown in FIG. 2.

In FIG. 12, an index including values 1 to n is divided into two parts and the parts are each processed by a processor 12 in parallel. Also, in a flowchart shown in FIG. 12, "[n/2]" means the largest integer value in the values which are less than n/2.

The vector computer system according to the invention described above can avoid an incorrect calculation when a plurality of updating processes about the same data are issued in a single vectorization unit. On the other hand, the shared memory parallel computer system according computer described later can avoid an incorrect calculation when a plurality of updating processes about the same data are performed in the different processor in parallel.

In FIG. 12, a sign "+=" is used in steps 1204 and 1208. The sign is, as described in connection with the vector computer, an operator meaning that the value in the right part is added to the variable in the left part. The operation is performed by the additional processing unit 30 shown in FIG. 3.

Therefore, each processor shown in FIG. 2 calculates "a(k)*x(column(k))", and sends the result, an identification of an address of "y(row(k))", and instruction of stating addition process to the memory control unit 20.

The memory control unit 20 sends the received data, the address, and an instruction to start the addition process, to the additional processing unit 30 where data of y(row(k)) are stored.

In response to instruction, the additional processing unit 30 performs the addition process of the y(row(k)).

In the vector computer system and the shared memory parallel computer system according to an embodiment of the invention, an accuracy of calculating result is maintained since the additional processing unit connected to a memory bank performs an addition process of data.

On performing the addition process, the addition process is sequentially performed for each memory bank, but as a whole, a high-speed processing can be realized since an operation of each memory bank is independent of others Next, description is made about a second embodiment of the invention in connecting with a updating process of a counter. In a similar way to the first embodiment, updating of the counter is performed accuracy and in a high-speed when updating processes of the same counter are issued in a single vectorization unit or when the updating processes of the same counter are performed from the different processors in the same time.

The updating process of the counter according to the second embodiment of the invention, counts data classified into several classes (or records locations of the data) in a classification process which classifies a plurality of real numbers into groups each of which includes numbers having the same integer part.

Figure 13:
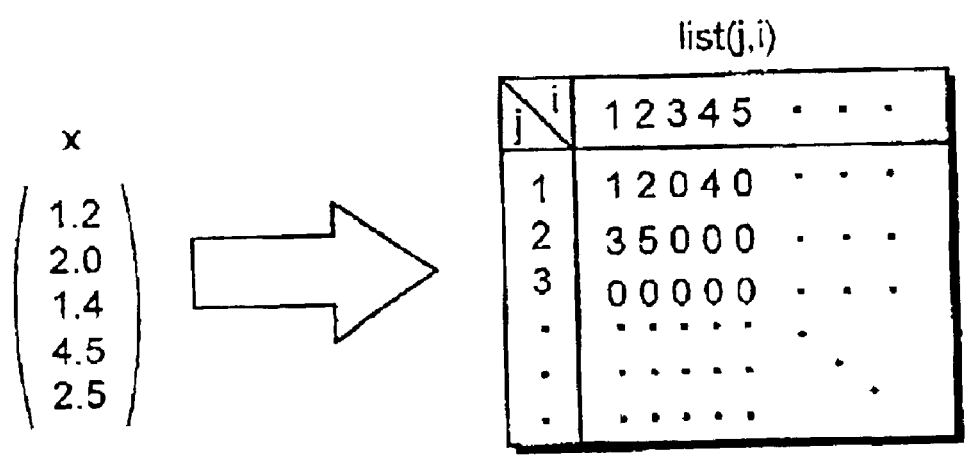
FIG. 13 shows a diagram for describing a classification process based on an integer part of a real number data.

In FIG. 13, an array x is shown as data to be classified. The array x includes five real numbers, and the numbers are listed as follows. x=(1.2, 2.0, 1,4, 4.5, 2.5)

Each element of the array x is classified based on an integer part, and classification results are stored into an array "list(j, i)" in order. Herein, in the array "list(j, i)", "i" means a value of an integer part, and "j" means the order that the data are classified.

For example, the first element "1.2" of the array x is classified at the first time, and represented as the list(1, 1). Also, the third element "1.4" of the array x is represented as the list(1, 2).

Figure 14:
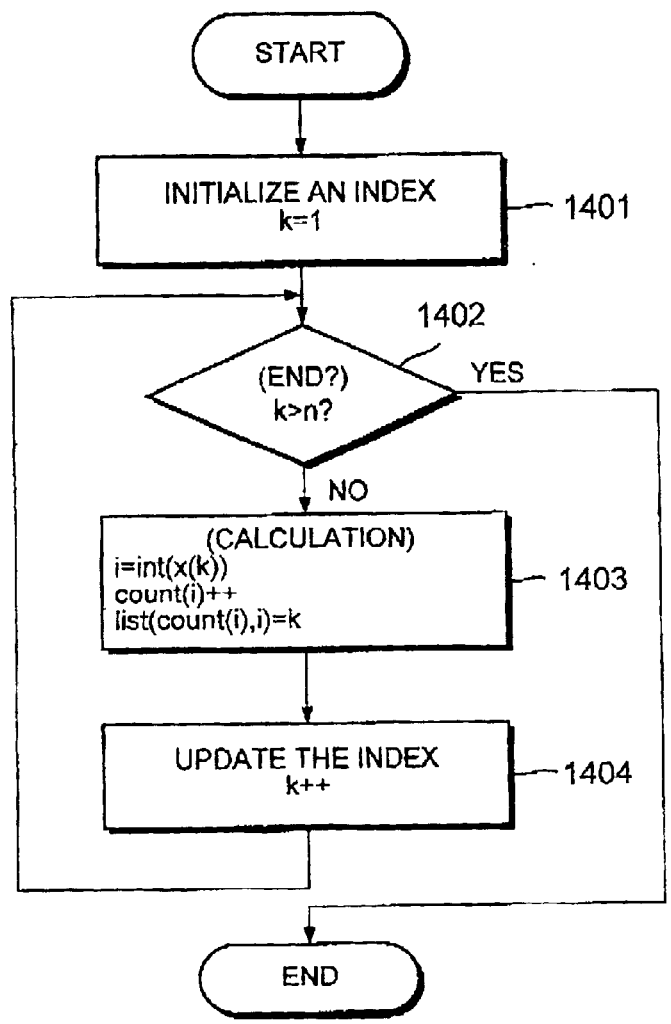
FIG. 14 shows a flowchart of an example of an algorithm for executing a classification process based on an integer part of a real number data.

In FIG. 14, there are "n" of real numbers to be classified, and each of the real numbers is represented as x(i) (i=1 to n). Also, a function "int"() outputs an integer part of the real number.

An array "count" represents the number of the real numbers which are classified into each integer group. For example, a value stored in "count(2)" represents the number of the real numbers having "2" as an integer part.

Herein, a size of the array count or the two-dimensional array "list" can be set to a proper size in progress. Also, the number of elements of the array "count" is set to an initial value "0". Further, "count(i)++" means an instruction to increment a value of an element "count(i)" by one.

In a calculating process in step 1403 shown in FIG. 14, for each index k, an integer part "i" of x(k) is determined and a value of a counter "count(i)" corresponding to the determined integer part "i" is incremented by "one". And then, the current value of the index "k" is set to as an element "list(count(i), i)". The element "list(count(i), i)" corresponds to a counter value "count(i) " of an integer part "i" in the two-dimensional array "list".

When the above operation is performed about all elements in the array x (k=1 to n) one after another, all of the elements (real numbers) are classified as shown in FIG. 13.

Figure 15:
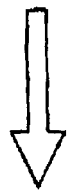
FIG. 15 shows a diagram for describing the classification process about the real number data shown in FIG. 13, using the algorithm of FIG. 14.

In FIG. 15, values (i/step) to be stored the two-dimensional array "list" and coordinates in the array where the values are stored are shown. The values and the coordinates are determined by counting each element in the array x for each group, according to the algorithm shown in FIG. 14, However, in the classification process shown in FIG. 14, there may be a case where a plurality of classification processes of data having the same integer part are issued in a single vectorization unit or where the classification processes are requested simultaneously from the different processors. Therefore, in this case, the array "count" or the two-dimensional array "list" may be incorrectly updated.

Consequently, in a conventional vector computer or shared memory parallel computer, it is impossible to perform vectorization and parallelization for the index k.

But, it is capable of performing the vectorization and the parallelization for the index k, by using the additional processing unit 30 shown in FIG. 3 as follows.

Figure 16:
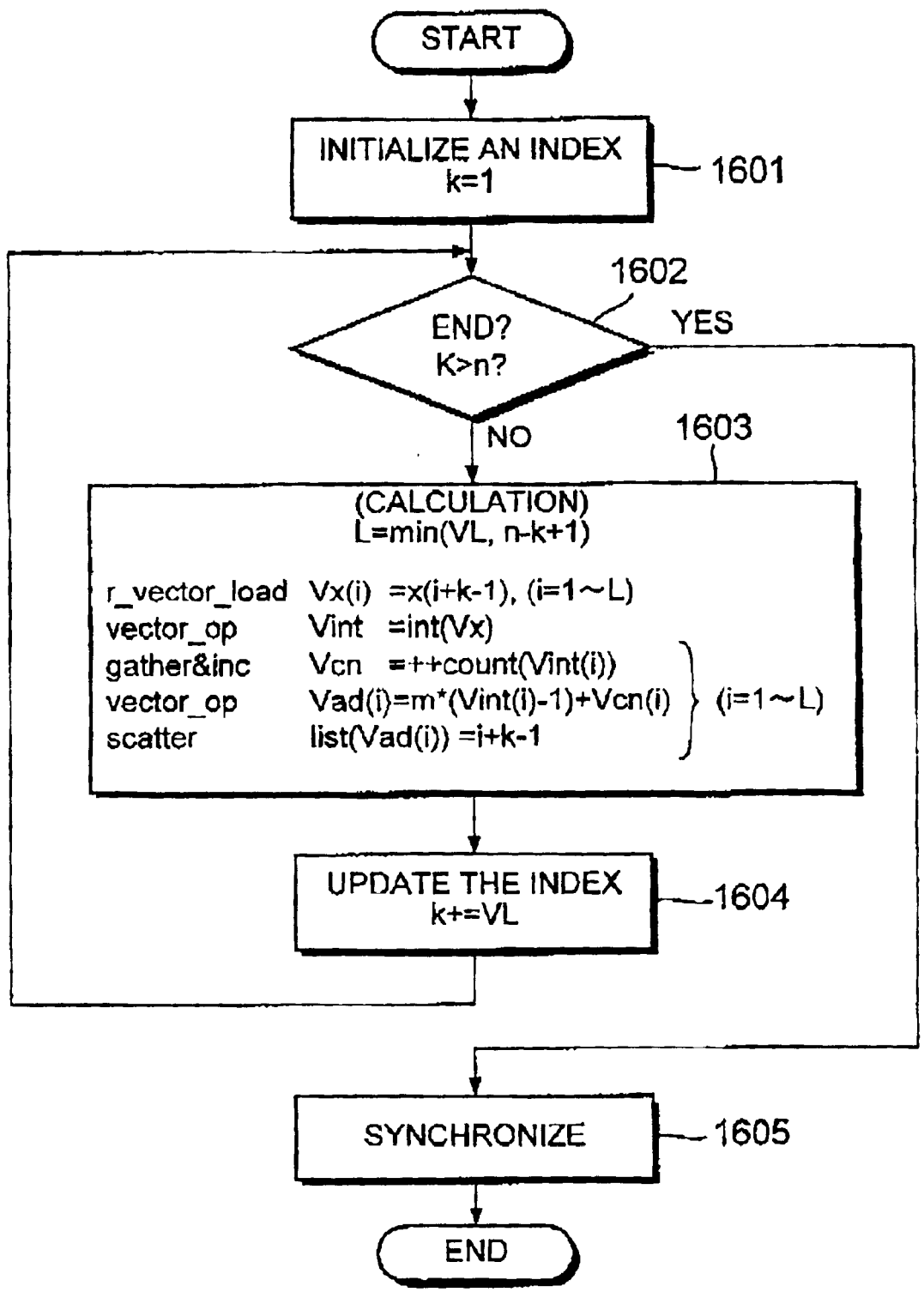
FIG. 16 shows a flowchart for describing a classification process based on an integer part of a real number data, in the vector computer system shown in FIG. 1.

In FIG. 16, n of real numbers to be classified are denoted by array x(i) (i=1 to n), and each element x(i) is classified and stored into the two-dimensional array "list", by using the array "count" as described in connection with FIG. 14.

Also, in FIG. 16, likely to the first embodiment, the classification process is performed by using the index k and the index k is divided into a plurality of segments each of which has a vector register length VL.

The last segment resulting from dividing the index may have a shorter length than the vector register length VL. If the last segment has the shorter length, undefined data (that is, data exceeds the index k=n) are read out. To overcome this problem, a length of the segment L is adjusted by using an equation "L=min(n−k+1, VL)".

Also, in step 1603, vector registers Vx, Vint, Vcn, and Vad are defined each of which is divided into a plurality of segments having a vector register length VL.

In this classification process, each element "list(j, i)" of the two-dimensional array "list" is transferred to an element of a one-dimensional array "list", by using an equation "list (m*(i−1)+j)=list (j i). Also, "m" means the number of the first dimension of the two-dimensional array "list(j, i)". That is, "j" falls within a range from one to m, in other words, the two-dimensional array "list" includes elements from "list (1, i)" to "list (m, i) for each i.

The flowchart shown in FIG. 16 is the same as the flowchart shown in FIG. 11, except for the calculation process step 1603.

In step 1603, first, using an instruction "r_vector_load", each number corresponding to indexes k to k+L−1 in the real number array x is loaded to the vector register Vx.

Next, for an instruction "vector_op", using a vector operation pipeline, integer part in each real number in the register Vx is calculated and the result is stored into the address vector register Vint. That is, an operation Vint(i)=int (Vx(i)), (i=1 to L) is performed.

Then, using an instruction "gather&inc", an counter value "count(Vint(i))" of each integer part Vint(i) is incremented by one and the result is loaded to the vector register Vcn by using a gather operation. Herein an operator "++" which is added to the left side of the left part of equation "count (Vint(i))" is an instruction to increment a value of "count (Vint(i))" by one, before a value of the right part of the equation is assigned to a value of the left part of the equation.

The instruction "gather&inc" not only loads the data by using the gather process but also performs an addition and updating process about the loaded integer data at each memory bank 40. The addition and updating process is performed by the additional processing unit 30.

The instruction "vector_op" calculates an index where the array "list" is stored based on a value Vint(i) and a counter value Vcn(i) for an integer part of each element, using a vector operation pipeline. And then, the instruction stores the integer part of the element into the address vector register Vad.

Finally, the instruction "scatter" distributes a value of each index (from k to k+L−1) into the corresponding address in the "list" referring to the indexes stored in the register Vad.

As described above, by using the second embodiment of the invention, vectorization of the index k is easily realized. For example, in the examples of classification process shown in FIGS. 13 and 15, the conventional vector computer system can not perform vectorization since when the index k=1 or 3, a common integer part "1" appears and when the index k=2 or 5, a common integer part "2" appears.

However, in the embodiment of the vector computer system, the vector processor 11 sends an instruction to update to the additional processing unit 30 one after another, and the instructions are stored in a shift register in the sending order and processed in the order to perform updating process correctly, even if the integer parts are gathered into a single vector (vectorization).

Figure 17:
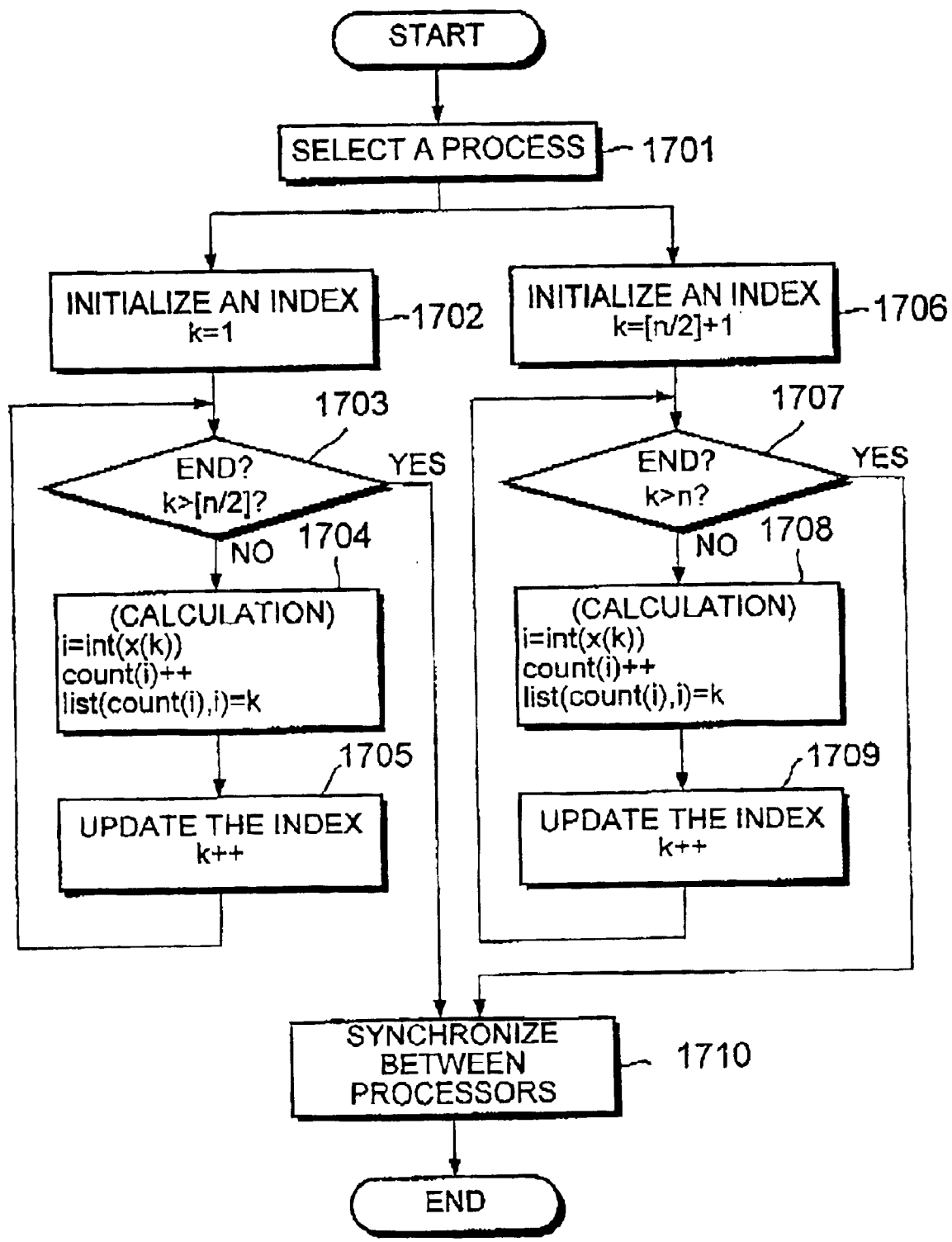
FIG. 17 shows a flowchart for describing a classification process based on an integer part of a real number data, in the shared memory parallel computer system shown in FIG. 2.

In FIG. 17, index including values 1 to n is divided into two parts and each of two processors 12 performs an operation about one of the two part.

Herein, in a calculation process in steps 1704 and 1708, likely to the above described vector computer, a updating process of the counter "count" and a storing process to store classification targets of real numbers into the "list" are performed by using the additional processing unit 30 shown in FIG. 3.

Thus, the vector computer system and the shared memory parallel computer system according to the invention can perform a high-speed operation correctly, by performing a updating process of data and an addition process of a counter at the additional processing unit 30 connected to the memory bank 40.

In this case, the updating process of the data is sequentially performed at each memory bank 40, but as a whole, a high-speed operation is achieved since each memory bank works independent of the other memory banks.

Also, the vector computer system and the shared memory parallel computer system according to the invention can be combined to perform the high-speed operation. That is, a vector processor which performs a vector operation according to the invention can be used as a processor of the shared memory parallel computer system shown in FIG. 2.

Description has been made about preferred embodiments of the invention, but the scope and the spirit of the invention is not limited to the embodiments, and for a person in the art, it is not difficult to amend and revise the vector computer system or the memory shared parallel computer system, within the scope and the sprit of the invention.

Therefore, a computer system according to the invention can perform a high-speed updating process correctly with maintaining a consistency of individual data objected to a vector operation or a parallel operation, by preparing additional processing units which work in parallel and independent of memory banks and performing a local and exclusive processing for each memory bank.

Further, according to the computer system of the invention, a process which can not be performed under vectorization (or parallelization) conventionally, such as a updating process of data in a memory and a classification process with counter updating can be easily performed in a high-speed after vectorization and parallelization.

What is claimed is:

1. A computer system which includes a plurality of memory banks, comprising:

a processor unit which controls processing of an operation; and additional processing units, each of which corresponds to one of the memory banks and performs the operation independently of the processor unit, wherein the operation is performed by the additional processing units, using data stored in the corresponding memory banks, based on an instruction or data provided from the processor unit, said plurality of memory banks being external to said processing unit and external to said additional processing units.

2. The computer system of claim 1, wherein the operation that each of the additional processing units performs includes at least one of calculating the data, reading the data from the memory bank, and writing the data to the memory bank.

3. The computer system of claim 1, wherein an address of the data in the memory bank is provided by the processor unit, and each of the additional processing units reads the data by referring to the address and performs the operation designated by the processor using the read data, and writes a result of the process into the address.

4. The computer system of claim 3, wherein, when the additional processing unit receives information from the processor unit and the operation designated by the processor comprises one of four basic operations of arithmetic, the additional processing unit performs one of the four basic operations using the read data and the received information.

5. The computer system of claim 3, further comprising at least one of:

an addition updating unit which updates the data located in the address designated by the processor unit to a value resulting from adding of the data and a predetermined value; and a subtraction updating unit which updates the data located in the address designated by the processor unit to a value resulting from subtracting a predetermined value from the data.

6. The computer system of claim 1, wherein the processor unit performs a vector operation.

7. The computer system of claim 1, wherein the processor unit comprises a plurality of processors, each of which performs an operation in parallel with another processor.

8. A method of controlling computation in a computer system which includes a plurality of memory banks, said method comprising:

instructing, at a processor unit, additional processing units, each of which is connected to one of the memory banks and works independently of the processor unit, to perform an operation;

reading, at the additional processing unit, data located in an address designated by the processor unit from the corresponding memory bank;

performing, at the additional processing unit, the operation instructed by the processor unit using the read data; and writing, at the additional processing unit, a result of the operation into the address designated by the processor unit, wherein said memory banks are external to said processor unit and external to said additional processor units.

9. The method of claim 8, further comprising:

receiving, at the additional processing unit, information from the processor unit, wherein the operation instructed comprises one of four basic operations of arithmetic, and the performing performs one of the four basic operations using the read data and the received information.

10. The method of claim 9 comprising one of:

updating data located in the address designated by the processor unit to a value resulting from adding of the data and a predetermined value; and updating data located in the address designated by the processor unit to a value resulting from subtracting a predetermined value from the data.

11. The method of claim 9, wherein the processor unit performs a vector operation.

12. The method of claim 9, wherein the processor unit comprises a plurality of processors, each of which performs an operation process in parallel with another processor.

13. A recording medium readable by a computer, tangibly embodying a program of instructions executable by the computer to perform a method of controlling computation in a computer system which includes a plurality of memory banks, the method comprising:

instructing, at a processor unit, additional processing units, each of which is connected to one of the memory banks and works independent of the processor unit, to perform an operation;

reading, at the additional processing unit, data located in an address designated by the processor unit from the corresponding memory bank;

performing, at the additional processing unit, the operation instructed by the processor unit using the read data; and writing, at the additional processing unit, a result of the operation into the address designated by the processor unit, wherein said plurality of memory banks are external to said processor unit and external to said additional processor units.

14. A computer data signal embodied in a carrier wave and representing a sequence of instructions which, when executed by a processor, cause the processor to perform a method of controlling computation in a computer system which includes a plurality of memory banks, the method comprising:

instructing, at a processor unit, additional processing units, each of which is connected to one of the memory banks and works independent of the processor unit, to perform an operation;

reading, at the additional processing unit, data located in an address designated by the processor unit from the corresponding memory bank;

performing, at the additional processing unit, the operation instructed by the processor unit using the read data; and writing, at the additional processing unit, a result of the operation into the address designated by the processor unit, wherein said plurality of memory banks are external to said processor unit and external to said additional processor units.

15. The computer system of claim 1, wherein each said additional processing unit locks out an access of its memory bank during a time the operation is being executed.

16. The method of claim 8, further comprising:

locking out, at the additional processor unit, an access of the corresponding memory bank to said processor during at least one of said reading, performing, and writing.

17. The computer system of claim 1, further comprising:

a memory controller located between said processor unit and said memory banks, said memory controller controlling a transmission of instruction and data to said plurality of memory banks.

18. The computer system of claim 17, further comprising:

an access arbitor located between said memory control unit and said additional processing unit to arbitrate exclusive control of a memory access to said memory bank.

19. A parallel processing apparatus, comprising:

a processor unit which controls a processing of an operation;

at least one additional processing unit; and a memory bank associated with each said at least one additional processing unit, each said memory bank being external to its associated processing unit and functioning independently of any other memory banks, wherein:

each said memory bank is accessible by said processor unit to provide at least one of data and instructions to each said additional processing unit for said operation processing; and each said additional processing unit can lock-out access to its associated memory bank during a processing of said operation.

* * * * *